June 9, 1925.
E. M. FISHER
AUTOMATIC FEEDING DEVICE
Filed Nov. 29, 1924      2 Sheets-Sheet 1
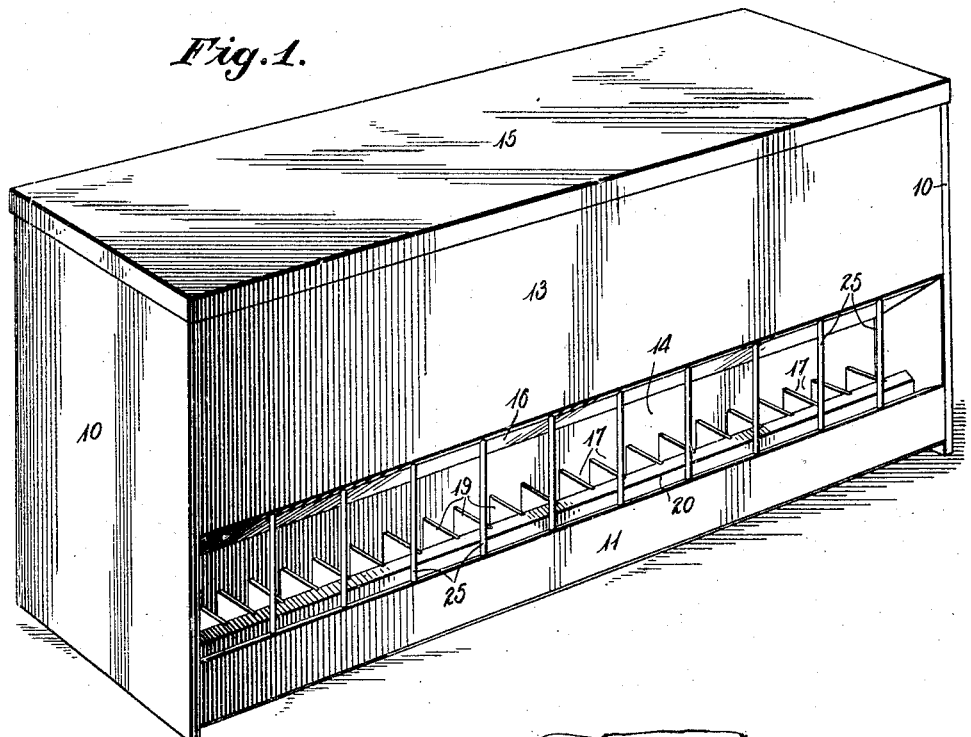
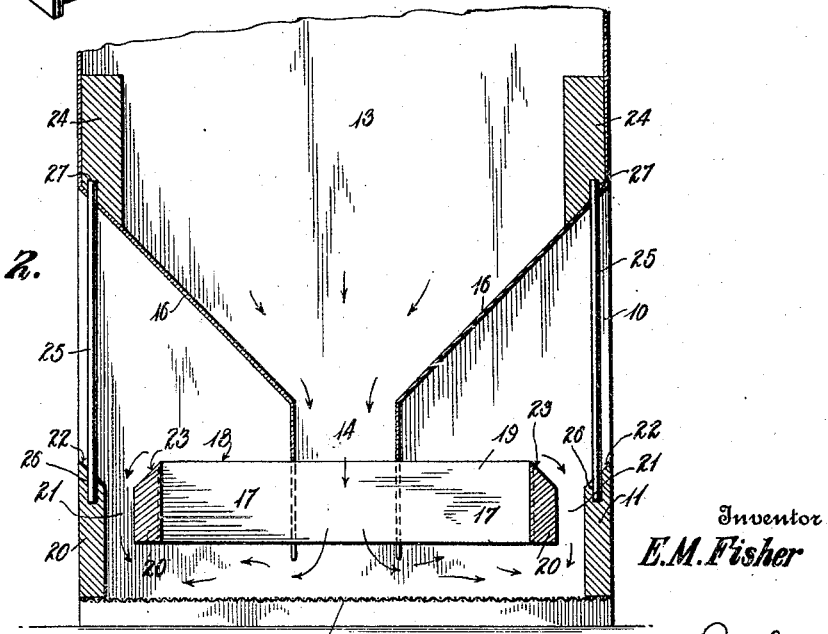
Inventor
E.M. Fisher

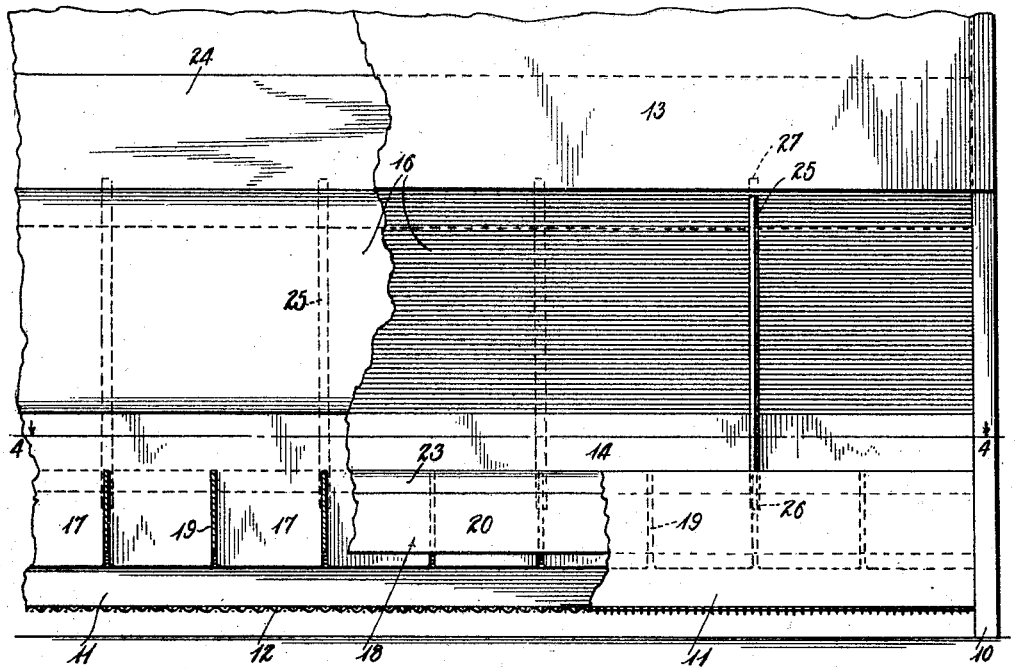
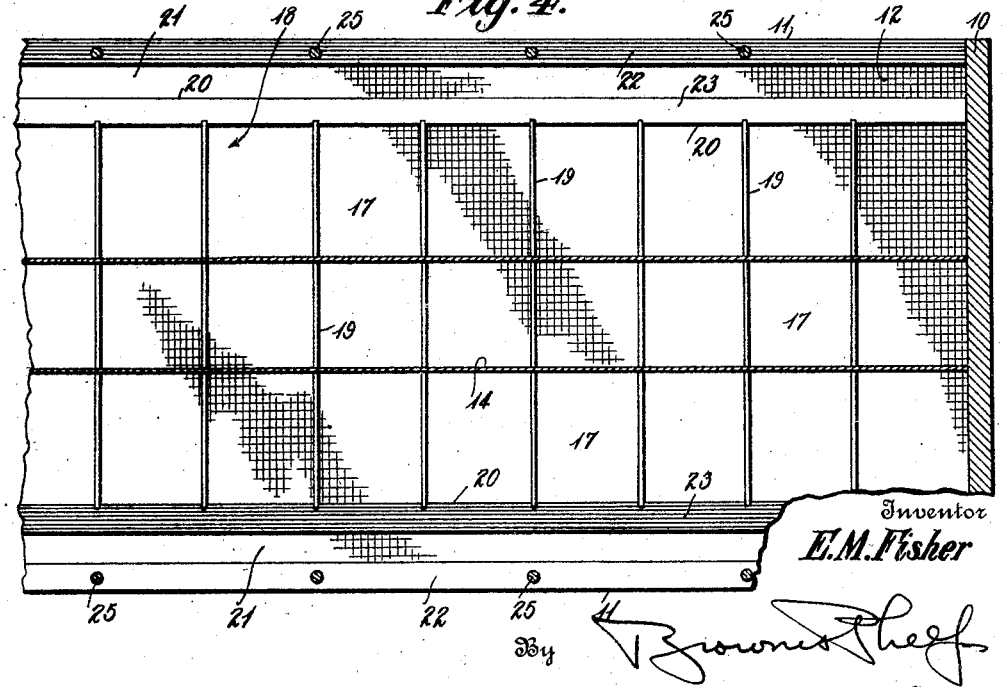

Patented June 9, 1925.

1,541,132

UNITED STATES PATENT OFFICE.

ERNEST M. FISHER, OF ATLANTA, GEORGIA.

AUTOMATIC FEEDING DEVICE.

Application filed November 29, 1924. Serial No. 752,890.

*To all whom it may concern:*

Be it known that I, ERNEST M. FISHER, a citizen of the United States, residing at Atlanta, in the county of Fulton and State of Georgia, have invented certain new and useful Improvements in Automatic Feeding Devices, of which the following is a specification.

My invention relates to a feed box or feeder primarily adapted for use in connection with fowls and particularly pigeons.

One important object is to provide a construction wherein the feed cannot be wasted or one kind of feed cannot be ejected and the preferred kind or kinds eaten to the exclusion thereof.

Another aim is to produce a structure wherein the supply of the feed will be solely subject to and in proportion to the quantity actually consumed.

A further object is to afford such a device in which the feed must be obtained through an open bottom cellular structure, preferably having one or more passages associated therewith for the return of dropped feed to the source of supply.

Additional objects and advantages will be partly pointed out or become apparent from the description following taken in connection with accompanying drawings illustrating one embodiment.

In said drawings:

Figure 1 is a perspective view of the feeder;

Figure 2 is a fragmentary transverse vertical sectional view thereof;

Figure 3 is a fragmentary side elevation, broken away to disclose details, of the feeder, and Figure 4 is a sectional view taken on the plane of line 4—4 of Fig. 3.

Referring specifically to the drawings wherein like reference characters designate like or similar parts, end walls or standards 10 are provided to rest upon a floor or other supporting surface. The walls 10 are spanned by relatively low or narrow side members 11 slightly raised above the bases of walls 10 and having a foraminous bottom 12 secured to their under surfaces and to the walls 10. A trough is thus formed between the side members 11 which is adapted to have feed supplied thereto by gravity from a hopper 13 of any approved construction through an outlet tube or discharge nozzle 14. The particular hopper illustrated is open at the top and normally closed by a removable cover 15. Bottom 12 constitutes a sieve for the feed so that dust may escape while still forming an efficient support for the feed.

Intermediate portions of the side walls of the hopper are inclined inwardly and downwardly as at 16 so as to provide space below them at each side of the feeder through which the fowls may obtain the feed.

The feed must be obtained through the relatively small cells 17 of a cellular structure generally designated 18. This structure 18 may be formed in any appropriate way. As a whole said structure 18 is raised above the bottom 12 or base of the trough and preferably slightly above the outlet of nozzle 14. Interfitting transverse partitions 19 interfit with the sides of the nozzle 14 and at their outer ends are connected to rails or side members 20 so as to produce the cellular structure. Side members 20 are connected to the walls 10 and the cells 17 are open at the bottom.

The side members 11 and 20 are spaced apart so as to provide passages 21 through which dropped feed may return by gravity to the supply in the trough and below the cellular structure. The upper edges of said side members are inclined or bevelled toward said passages as at 22 and 23, respectively.

Within the hopper 13 longitudinal frame members 24 are provided. Guard rods or bars 25 are suitably spaced apart and located at each side of the feeder so as to define the spaces through which the fowls may feed. Said rods enter recesses 26 in side members 11 and pass through walls 16 and enter recesses in the frame members 24 at 27 as one means of holding them in place.

In use, as nozzle 14 is open at the bottom, the feed flows by gravity from hopper 13 onto the bottom 12 of the trough, spreading thereover beneath the cells 17. The quantity of feed which may thus enter the trough is limited to a level corresponding with the lower end of the nozzle. The pigeons or other fowls must reach over side members 11 and 23 in order to obtain the feed. The fowls must dispose their bills in the adjacent cells 17 and they must eat with their bills in this relation. Should they attempt to scatter or throw the feed laterally, it cannot escape because of the walls of the cells, and if they should raise their bills and try to throw the feed under their breasts, the feed will hit their breasts and thus fall into the passages 21 and thus by gravity return to the main supply of feed beneath the cellular structure. Said passages 21 are relatively narrow so that there is no danger of the fowls feeding therefrom rather than through the cellular structure. The rods 25 are preferably so spaced that a single fowl may feed between each pair thereof and in the arrangement shown have access to two cells 17 although the number may be varied so long as the cells remain relatively small and insure feeding by the fowls as described.

I have found the construction illustrated and described to be particularly meritorious in the feeding of pigeons, one of whose habits is to eject undesirable grain from a mixture. Such undesired feed or grain cannot be ejected because it will not be thrown out laterally because of the cellular structure and cannot be thrown under the breast and furthermore will be returned to the main supply through the passages 21. In this way all feed dispensed form the hopper must be eaten, and the proper quantity eaten before more will automatically feed by gravity in the manner described. This feature also enables the owner or fancier to determine the amount of protein and other food properties which the fowl eats. Also hemp may be fed during molting time with assurance as to the quantity eaten.

I have found the construction illustrated and described to be particularly meritorious in the prevention of the pigeons or fowls from fouling the grain or feeder. The sides being in a straight line no filth can fall into the tray and as the opening in the sides is limited, only the head of the fowl can enter the feeder. It is impossible for them to perch on side members 11 and 20 as wall 16 prevents.

Limitation to the use of the device in connection with the feeding of pigeons or other fowls is not to be inferred as many of its features are capable of more general adaptation, and further various changes may be resorted to within its spirit and scope.

I claim:

1. A feeder having a feed trough, a structure associated therewith open at the bottom and beneath which the feed is supplied and through which the feed must be obtained, the feeder having a passageway outwardly of said means through which dropped feed may return by gravity to the feed within the trough and below the said means.

2. A feeder having a feed trough, a structure associated therewith open at the bottom and beneath which the feed is supplied by gravity and through which the feed must be obtained, and the feeder having a passageway outwardly of the outlet of said means through which feed which is dropped may return by gravity to the feed within the trough and below the said means.

3. A feeder having a feed trough, a cellular structure above the base of the trough spaced from the sides thereof to provide passages, a feed supply hopper having its outlet inwardly of the sides of said structure and relatively close to the base of the trough, the cells of said structure being open at the bottom and arranged so that the feed must be reached therethrough, and said passages being arranged to return dropped feed by gravity to the feed within the trough and below said cells.

4. A feeder for fowls or the like having means to contain feed, and a cell associated therewith open at the bottom and in which the bill of the fowl must be disposed while obtaining the feed.

5. A feeder for fowls or the like having means to contain feed, a cellular structure associated therewith having its cells open at the bottom and arranged so that the bills of the fowls must be disposed therein while obtaining the feed, and means to supply feed to said first means below said structure.

6. A feeder for fowls or the like having a feed trough, a cellular structure associated therewith, a feed supply hopper having its outlet intermediate opposed marginal edges of said structure and adjacent the base of the trough, said cells being open at the bottom and arranged so that the bills of the fowls must be disposed therein while obtaining the feed.

7. A feeder having a feed trough provided with side members, a cellular structure associated with the trough and raised with respect to the base thereof, said structure being spaced from said sides to provide passages, a feed supply hopper having its outlet inwardly of the sides of said structure and relatively close to the base of the trough, said hopper above said structure having inwardly and downwardly extending walls to provide access to the cells of said structure, said cells being open at the bottom and arranged so that the feed must be reached therethrough, and said passages being arranged to return dropped feed by gravity to the feed within the trough and below said cells.

8. A feeder having end walls, relatively low side members joining said walls and raised above the bases thereof, a foraminous bottom associated with said side members to provide a trough, a hopper above said trough supported with its outlet relatively close to said foraminous bottom, a cellular structure supported within the trough above said foraminous bottom and with its sides in spaced relation to said side members to provide passages, the outlet of said hopper being disposed inwardly and at a distance from the sides of said structure, the side walls of the hopper above said structure extending inwardly and downwardly to permit access to the feed trough, the cells of said structure being open at the bottom and arranged so that feed must be reached therethrough, and said passages being arranged to return dropped feed by gravity to the feed within the trough and below said cells.

ERNEST M. FISHER.